Patented Nov. 24, 1953

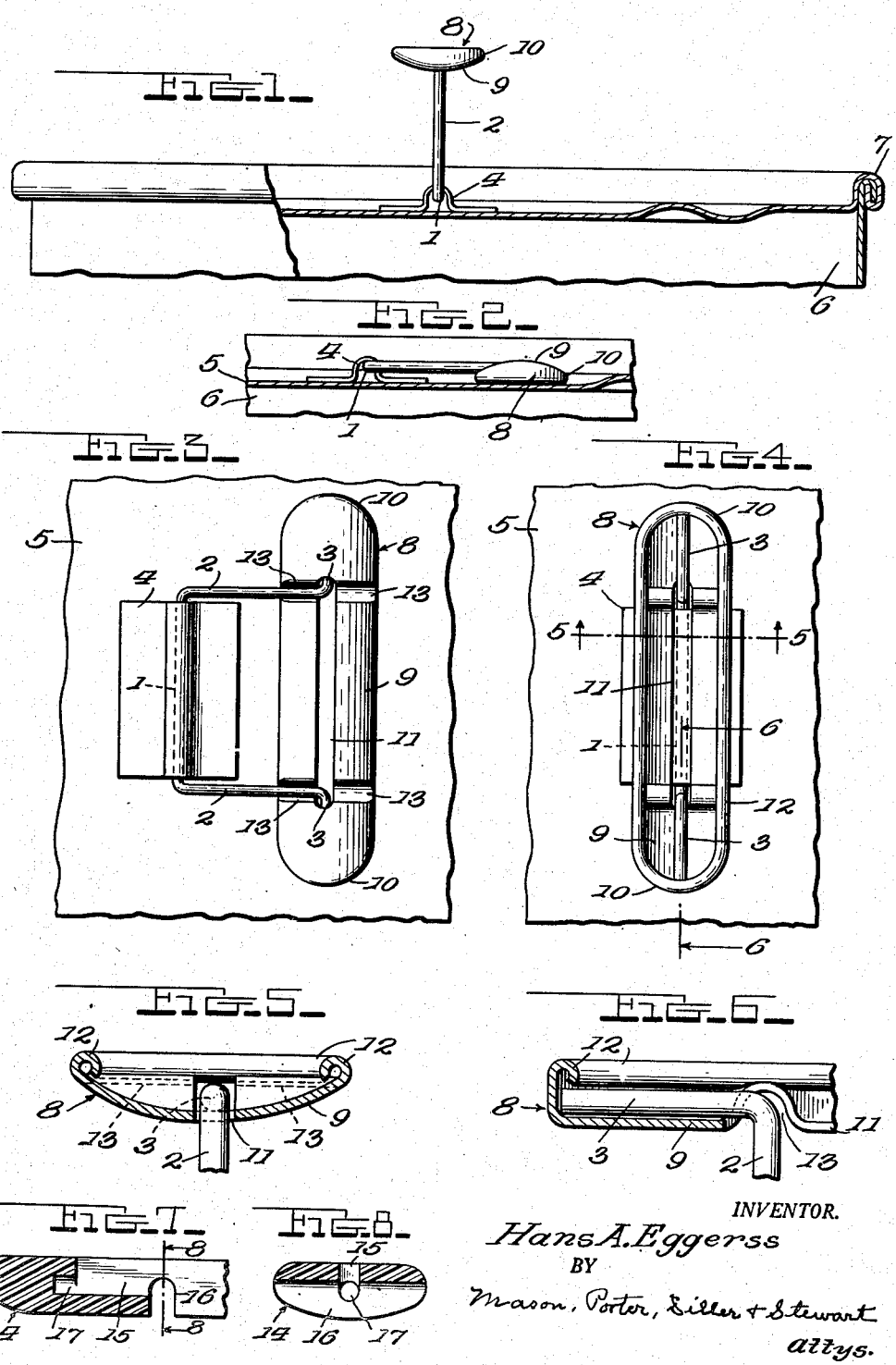

2,659,928

UNITED STATES PATENT OFFICE 2,659,928

COMBINED WIRE BAIL AND HANDGRIP FOR CONTAINERS

Hans A. Eggerss, New York, N. Y., assignor to Continental Can Company, Inc., New York, N. Y., a corporation of New York Application June 26, 1950, Serial No. 170,394

2 Claims. (Cl. 16—126)

The invention relates to new and useful improvements in a combined bail and hand grip for containers.

An object of the invention is to provide a bail and hand grip which is adapted when not in use to be positioned close to the container end to facilitate the stacking of containers one on another;

A further object of the invention is to provide a bail and hand grip of the above type wherein the hand grip is so formed that it extends outward transversely and longitudinally of the bail and is so mounted on the bail that it may be turned to a position substantially parallel to the plane of the bail and thus positioned close to the container end;

A still further object of the invention is to provide a bail and hand grip of the above type wherein the hand grip has rounded end portions, is curved transversely and has its peripheral edge beaded to strengthen the grip and provide pockets to receive the bail ends.

Another object of the invention is to provide a bail and hand grip of the above type wherein the bail arms extend through a longitudinal slot in the grip and are provided with outwardly extending end portions having the extreme ends thereof housed within the beaded edge and wherein said grip on the face thereof adjacent the bail arms is provided with grooves adapted to receive the bail arms.

In the drawings, which show by way of illustration one embodiment of the invention;

Figure 1 is a view showing the combined bail and hand grip attached to a container top and positioned ready for carrying the container;

Figure 2 is a view similar to Figure 1, but showing the bail and the hand grip turned to a nested position adjacent the container top and substantially beneath a plane containing the outer edge portion of the seam joining the container end to the container body;

Figure 3 is a plan view of the bail and hand grip with the bail positioned as shown in Figure 2;

Figure 4 is a plan view of the bail and hand grip with the parts positioned as shown in Figure 1;

Figure 5 is a sectional view on the line 5—5 of Figure 4;

Figure 6 is a sectional view on the line 6—6 of Figure 4;

Figure 7 is a longitudinal section through a portion of the bail hand grip made of plastic; and Figure 8 is a transverse sectional view on the line 8—8 of Figure 7.

The invention has to do with a combined bail and hand grip for containers. The bail is made of wire and is bent so as to provide a straight central portion with arms extending outwardly from the ends thereof at right angles thereto. The outer end portions of the bail arms are bent outwardly and disposed in axial alignment. This bail is adapted to be secured to a container by a cleat, which may be welded or soldered to the container end and is so shaped as to provide a pivotal attaching means for the central portion of the bail. The hand grip may be made of sheet metal, a plastic, or any suitable material and is of considerably greater width than the bail and extends longitudinally of the bail. This hand grip is mounted on the aligned end portions of the bail. The hand grip is curved transversely and provided with rounded ends. The bail arms extend through a longitudinal slot in the hand grip and the peripheral edge of the hand grip is rolled inwardly or beaded so as to strengthen the hand grip and house the extreme ends of the aligned end portions of the bail. The curved face adjacent each end of the longitudinal slot is grooved inwardly so as to receive the bail arms and thus permit the hand grip to be turned on the bail ends to a position substantially parallel with the plane of the bail or at right angles thereto.

Referring more in detail to the drawings, the bail is made of wire and includes a central portion 1 at the ends of which are outwardly extending bail arms 2, 2. Each bail arm is bent outwardly as indicated at 3 and these outwardly extending end portions of the bail are arranged in axial alignment.

The bail is secured to a container end by a cleat 4. The container end is indicated at 5 and as shown in Figure 1 the container end is secured to the container body 6 by the usual double seam 7. This cleat may be welded or soldered to the container end and is shaped so as to receive the central portion 1 of the bail. This provides a pivotal connection between the bail and the container end which permits the bail to be swung to a position at right angles to the container end as shown in Figure 1, or to a position parallel with the container end as shown in Figure 2.

The hand grip 8 may be made from sheet metal by die shaping and curling or from a plastic material by molding. It is of considerably greater width than the wire bail and extends beyond the limits of the wire bail. This hand grip includes a transversely curved portion 9 and has the ends thereof rounded as indicated at 10, 10. Extending longitudinally of the hand grip is a slot 11 which is of greater length than the central portion 1 of the bail so that this central portion and the arms may be inserted through the slot and the bail ends brought into engagement with the inner face of the curved portion 9 of the grip. When the grip is made of sheet metal it may be rolled inwardly all the way around the grip as indicated at 12. This rolled edge greatly strengthens the grip and also provides a very smooth edge portion for contact with the fingers of the person carrying the container. If the grip is made of a molded plastic material then a bead can be formed around the edge similar to this curled edge of metal and for the same purpose. This curled portion or the bead, extends inwardly as shown in Figures 5 and 6 and at the ends of the grip the curled portion or bead is spaced away from the curved portion of the grip so as to provide a recess or space which is adapted to receive the extreme end portions of the outwardly bent parts 3 of the bail. The bail and the hand grip may be readily assembled by passing the bail through the slot 11 and then springing the arms 2, 2 of the bail toward each other and this will permit first one bail end to be housed and then the other to spring into its recess or pocket at the other end of the grip. The spring of the bail arms will hold the bail and the grip in assembled position as shown in the drawings. When the bail is in the position shown in Figure 1 some of the fingers of the hand may be inserted between the arms of the bail and others along the outside of the bail and therefore all of the fingers may be employed in the carrying of the container and each finger will engage the smooth curved surface of the grip.

The curved portion 9 of the hand grip on the underface thereof is provided with grooves 13, 13 at each end thereof. These grooves are disposed adjacent the ends of the longitudinal slot so that when the hand grip is turned on the bail ends 3 the arms will engage the grooves and this permits the hand grip to be swung to a plane substantially parallel with the plane of the bail as shown in Figures 2 and 3.

In Figures 7 and 8 there is shown a molded plastic hand grip such as referred to above. The hand grip is indicated at 14. Extending longitudinally of the hand grip is a slot 15 and near each end there is a recess 16 extending laterally across the body of the hand grip which corresponds to the grooves 13 of Figure 3. There is also a pocket 17 into which the ends of the wire bail are sprung.

It is obvious that many changes in the details of construction may be made without departing from the spirit of the invention as set forth in the appended claims.

I claim:

1. The combination of a wire bail having a straight central portion and arms extending from the ends thereof at right angles thereto, the outer end portions of said bail arms being bent away from each other and disposed in axial alignment, and a hand grip shaped so as to extend outwardly transversely and longitudinally of the bail and beyond the bail arms, said grip being curved transversely and provided with a slot extending longitudinally thereof, said grip being mounted on the bail ends with the arms extending through said slot and the outer end portions of the bail in engagement with the grip adjacent the slot, the peripheral edge of the grip being extended inwardly to strengthen the grip and confine the bail ends to a pivotal movement relative to the grip.

2. The combination of a wire bail having a straight central portion and arms extending from the ends thereof at right angles thereto, the outer end portions of said bail arms being bent away from each other and disposed in axial alignment, and a hand grip formed of sheet metal extending transversely and longitudinally of the bail and beyond the said bail arms, said grip being curved transversely and provided with a slot extending longitudinally thereof, said grip being mounted on the bail ends with the arms extending through said slot and the outer end portions of the bail in engagement with the grip adjacent the slot, the peripheral edge of the grip being rolled inwardly to strengthen the grip and confine the bail ends to a pivotal movement relative to the grip, said grip adjacent the ends of the longitudinal slot having grooves extending at right angles thereto on the face thereof adjacent the bail arms and adapted to receive the bail arms when the grip is turned to a position substantially parallel with the plane of the bail.

HANS A. EGGERSS.

References Cited in the file of this patent

UNITED STATES PATENTS

| Number | Name | Date |
|---|---|---|
| 1,040,596 | Watraus | Oct. 8, 1912 |
| 1,168,345 | Tamagno | Jan. 18, 1916 |
| 1,781,583 | Hodgson | Nov. 11, 1930 |
| 2,233,516 | Cecil | Mar. 4, 1941 |
| 2,364,105 | Socke | Dec. 5, 1944 |

FOREIGN PATENTS

| Number | Country | Date |
|---|---|---|
| 388,987 | France | June 15, 1908 |